(12) United States Patent
Wong et al.

(10) Patent No.: US 12,681,281 B2
(45) Date of Patent: Jul. 14, 2026

(54) CATADIOPTRIC LENS ASSEMBLY HAVING TWO OR MORE LENS COMPONENTS

(71) Applicant: 3M INNOVATIVE PROPERTIES COMPANY, St. Paul, MN (US)

(72) Inventors: Timothy L. Wong, West St. Paul, MN (US); John D. Le, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 678 days.

(21) Appl. No.: 18/025,020

(22) PCT Filed: Aug. 13, 2021

(86) PCT No.: PCT/IB2021/057484
§ 371 (c)(1),
(2) Date: Mar. 7, 2023

(87) PCT Pub. No.: WO2022/053891
PCT Pub. Date: Mar. 17, 2022

(65) Prior Publication Data
US 2025/0180882 A1 Jun. 5, 2025

Related U.S. Application Data

(60) Provisional application No. 63/077,206, filed on Sep. 11, 2020.

(51) Int. Cl.
*G02B 17/08* (2006.01)

(52) U.S. Cl.
CPC ................................ *G02B 17/0804* (2013.01)

(58) Field of Classification Search
CPC .............. G02B 17/0804; G02B 5/3083; G02B 17/0856; G02B 27/0172; G02B 27/286; G02B 25/001
See application file for complete search history.

(56) References Cited

U.S. PATENT DOCUMENTS

| | | | |
|---|---|---|---|
| 5,644,436 A | 7/1997 | Togino et al. | |
| 2015/0205130 A1* | 7/2015 | Border | G02B 27/144 359/630 |

(Continued)

FOREIGN PATENT DOCUMENTS

| | | |
|---|---|---|
| JP | H07231413 A | 8/1995 |
| WO | 2017136448 A1 | 8/2017 |
| WO | 2018163035 A1 | 9/2018 |

OTHER PUBLICATIONS

International Search Report for PCT International Application No. PCT/IB2021/057484, mailed on Nov. 2, 2021, 4 pages.

*Primary Examiner* — Mariam Qureshi
(74) *Attorney, Agent, or Firm* — Jonathan L. Tolstedt

(57) ABSTRACT

An optical lens assembly includes a middle-lens disposed between, and bonded to, an eye-lens and a display-lens, each of the lenses including an active lens region defined as a maximum lens region configured to transmit an image emitted by a display therethrough. A first at least partially light transmitting film is disposed on, and substantially conforming to, a curved first major surface of the eye-lens. A second at least partially light transmitting film is disposed between, and substantially conforming to each of, a curved second major surface of the eye-lens and a curved first major surface of the middle-lens. A first retarder layer is disposed between, and substantially conforming to each of, a second major surface of the middle-lens and a first major surface of the display-lens; and a third at least partially light transmitting film is disposed on, and substantially conforming to, a curved second major surface of display-lens.

19 Claims, 7 Drawing Sheets

(56)         References Cited

U.S. PATENT DOCUMENTS

2017/0017077 A1      1/2017  Tang et al.
2018/0039052 A1 *    2/2018  Khan  ................. G02B 17/0856
2020/0096770 A1 *    3/2020  Pedder  .............. G02B 27/0172

* cited by examiner

CATADIOPTRIC LENS ASSEMBLY HAVING TWO OR MORE LENS COMPONENTS

CROSS REFERENCE TO RELATED APPLICATIONS

This application is a national stage filing under 35 U.S.C. 371 of PCT/IB2021/05748, filed Aug. 13, 2021, which claims the benefit of Provisional Application No. 63/077, 206, filed Sep. 11, 2020, the disclosure of which is incorporated by reference in their entireties herein.

SUMMARY

In some aspects of the present description, an optical lens assembly for displaying an image emitted by a display to a viewer is provided, the lens assembly including a middle-lens disposed between, and bonded to, an eye-lens and a display-lens. Each of the lenses has an active lens region defined as a maximum lens region configured to transmit an image emitted by the display therethrough. Across the corresponding active lens regions, the eye-lens includes opposing curved first and second major surfaces, a maximum thickness tmax1, and a minimum thickness tmin1 less than tmax1 by less than a factor of 2; the middle-lens includes a curved first major surface, an opposing second major surface, and a maximum thickness tmax2 greater than tmax1 by at least a factor of 1.5; and the display-lens includes a first major surface and an opposing curved second major surface. A first at least partially light transmitting film is disposed proximate on, and substantially conforms to, the curved first major surface of the eye-lens. A second at least partially light transmitting film is disposed between, and substantially conforms to each of, the curved second major surface of the eye-lens and the curved first major surface of the middle-lens. A first retarder layer is disposed between, and substantially conforms to each of, the second major surface of the middle-lens and the first major surface of the display-lens. A third at least partially light transmitting film is disposed on, and substantially conforms to, the curved second major surface of display-lens. For a substantially normally incident light and at least one wavelength in a visible wavelength range (i.e., human-visible) extending from about 450 nm to about 650 nm, each of the first through third at least partially light transmitting layers transmits at least 30% of the normally incident light having a first polarization state, and each of the second and third at least partially light transmitting layers rejects at least 30% of the normally incident light having an orthogonal second polarization state.

In some aspects of the present description, an optical lens assembly for displaying an image emitted by a display to a viewer is provided, the lens assembly including a middle-lens disposed between, and bonded to, an eye-lens and a display-lens, each of the lenses having an active lens region defined as a maximum lens region configured to transmit an image emitted by the display therethrough. At least across the corresponding active lens regions: the eye-lens includes opposing curved first and second major surfaces, each of the major surfaces of the eye-lens having an actual surface profile that deviates by a first maximum peak-to-valley from a prescribed surface profile, the first maximum peak-to-valley deviation being less than about 10 microns, the eye-lens having a maximum thickness tmax1 and a minimum thickness tmin1 less than tmax1 by less than about 30%; the middle-lens includes a curved first major surface bonded to the second major surface of the eye-lens and an opposing second major surface, at least one of the first and second major surfaces of the middle-lens having an actual surface profile that deviates by a second maximum peak-to-valley from a prescribed surface profile, the second maximum peak-to-valley deviation being greater than about 15 microns, the middle-lens having a maximum thickness tmax2 greater than tmax1 by at least a factor of 2; and the display-lens includes a first major surface bonded to the second major surface of the middle-lens and an opposing curved second major surface. A reflective polarizer is disposed between, and substantially conforming to each of, the curved second major surface of the eye-lens and the curved first major surface of the middle-lens. For a substantially normally incident light and at least one wavelength in a visible wavelength range extending from about 450 nm to about 650 nm, the reflective polarizer transmits at least 50% of the normally incident light having a first polarization state and reflects at least 50% of the normally incident light having an orthogonal second polarization state.

In some aspects of the present description, an optical lens assembly for displaying an image emitted by a display to a viewer is provided, the lens assembly including a middle-lens disposed between, and bonded to, an eye-lens and a display-lens, each of the lenses having an active lens region defined as a maximum lens region configured to transmit an image emitted by the display therethrough. At least across the corresponding active lens regions, the eye-lens includes opposing curved first and second major surfaces, a maximum thickness tmax1 at a first location of the eye-lens, and a minimum thickness tmin1 at a second location of the eye-lens spaced apart from the first location by a distance d1, such that tmin1 is less than tmax1 by less than about 30%, and (tmax1-tmin1)/d1 is less than about 0.1. The middle-lens includes a curved first major surface bonded to the second major surface of the eye-lens, an opposing second major surface, a maximum thickness tmax2, and a minimum thickness tmin2 less than tmax2 by greater than about 30%, such that tmax2 is greater than tmax1 by at least 30%. The middle-lens has a maximum birefringence of less than about 15 nm for at least one wavelength in a visible wavelength range extending from about 450 nm to about 650 nm. The display-lens includes a first major surface bonded to the second major surface of the middle-lens and an opposing curved second major surface. A reflective polarizer is disposed between, and substantially conforming to each of, the curved second major surface of the eye-lens and the curved first major surface of the middle-lens. For substantially normally incident light and the at least one wavelength in the visible wavelength range, the reflective polarizer transmits at least 50% of the normally incident light having a first polarization state and reflects at least 50% of the normally incident light having an orthogonal second polarization state.

In some aspects of the present description, an optical lens assembly for displaying an image emitted by a display to a viewer along an optical axis is provided, the lens assembly including a middle-lens disposed between, and bonded to, an eye-lens and a display-lens. Each of the lenses has an active lens region defined as a maximum lens region configured to transmit an image emitted by the display therethrough along the optical axis. For at least across the corresponding active lens regions: the eye-lens includes opposing curved first and second major surfaces, a maximum thickness tmax1 and a minimum thickness tmin1, tmin1 less than tmax1 by less than about 30%; the middle-lens includes a curved first major surface bonded to the second major surface of the eye-lens, an opposing second major surface, a maximum thickness tmax2, and a minimum thickness tmin2 less than tmax2 by greater than about 30%, such that tmax2 is greater than tmax1 by at least 30%; and the display-lens includes a first major surface facing the second major surface of the middle-lens and an opposing curved second major surface. The active lens regions of the middle-lens and the display-lens define a space between the second major surface of the middle-lens and the first major surface of the display-lens. One or more optical elements fill the space and bond the middle-lens and the display lens to each other. Within the space, a minimum gap between the second major surface of middle-lens and the first major surface of the display-lens is Gmin, and a maximum gap between the second major surface of middle-lens and the first major surface of the display-lens is Gmax, such that Gmax–Gmin is greater than or equal to about 20 microns.

In some aspects of the present description, an optical lens assembly for displaying an image emitted by a display to a viewer along an optical axis is provided, the lens assembly including a middle-lens disposed between, and bonded to, an eye-lens and a display-lens. Each of the lenses has an active lens region defined as a maximum lens region configured to transmit an image emitted by the display therethrough along the optical axis. At least across the corresponding active lens regions: the eye-lens includes opposing curved first and second major surfaces, a maximum thickness tmax1 and a minimum thickness tmin1, tmin1 less than tmax1 by less than about 30%; the middle-lens includes a curved first major surface bonded to the second major surface of the eye-lens, an opposing second major surface, a maximum thickness tmax2, and a minimum thickness tmin2 less than tmax2 by greater than about 30%, such that tmax2 is greater than tmax1 by at least 30%; and the display-lens includes a first major surface facing the second major surface of the middle-lens and an opposing curved second major surface. The active lens regions of the middle-lens and the eye-lens define a space between the first major surface of the middle-lens and the second major surface of the eye-lens. One or more optical elements fill the space and bond the middle-lens and the eye-lens to each other. In the space, a minimum gap between the first major surface of the middle-lens and the second major surface of the eye-lens is Hmin, and a maximum gap between the first major surface of the middle-lens and the second major surface of the eye-lens is Hmax, such that Hmax–Hmin is greater than or equal to about 20 microns.

In some aspects of the present description, an optical lens assembly is provided, the optical lens assembly including a middle-lens disposed adjacent, and bonded to, a display-lens, the middle-lens having a curved first major surface and an opposing second major surface, a maximum thickness tmax, and a minimum thickness tmin less than tmax by greater than about 30%, and the display-lens having a first major surface facing the second major surface of the middle-lens and an opposing curved second major surface; and an optical film disposed between, and bonded to at least one of, the second major surface of the middle-lens and the first major surface of the display-lens. The second major surface of the middle-lens and the first major surface of the display-lens define a space therebetween, wherein, in the space, a minimum gap between the second major surface of the middle-lens and the first major surface of the display-lens is Gmin, and a maximum gap between the second major surface of the middle-lens and the first major surface of the display-lens is Gmax, Gmax–Gmin≥20 microns.

DETAILED DESCRIPTION

Figure 1:
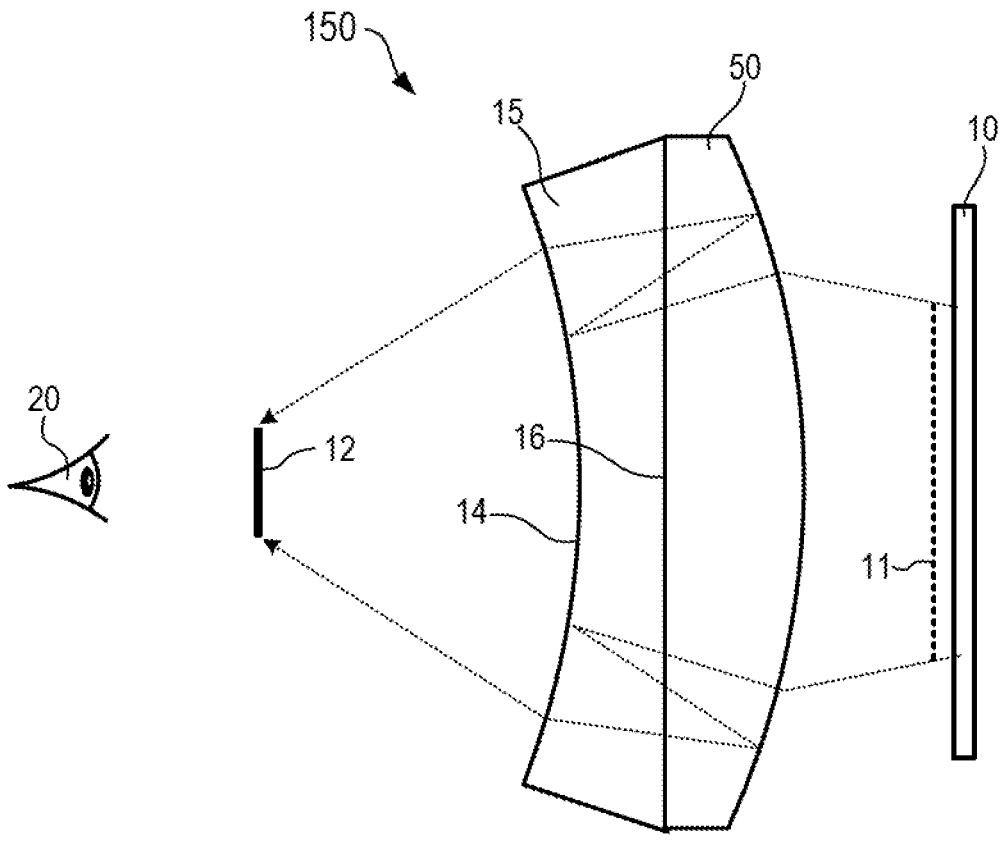
FIG. 1 is a side, cutaway view of a two-lens optical lens assembly typical of the prior art.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Polarized, catadioptric (i.e., involving both the reflecting and refracting of light) lens systems require lenses to have high both form accuracy and low birefringence simultaneously. High form accuracy is required because, in a typical catadioptric lens system, two surfaces are reflective, and reflective surfaces deviate beams by twice the angle of incidence. Because of the large beam deviation upon reflection, form errors (creating local slope errors) result in large wavefront errors upon reflection. Low birefringence is required because polarized, catadioptric lenses use polarization conversion to "fold" the optical path. Any birefringence present in the lenses will modify the polarization state from an ideal state, resulting in a lens assembly with reduced contrast, reduced efficiency, and reduced primary image brightness.

When designing compact, wide field-of-view, polarized, catadioptric lens systems, extreme lens shapes that have large variations in thickness may be required. It is well known in the art that large thickness variations in molded plastic lenses result in both significant form error and significant birefringence. Both form error and birefringence are due to thermal shrinkage during the cooling phase of the injection molding process which induces shape change and builds internal stresses. Built-in tensile, compressive, and shear stresses change the local index of refraction of the lens resulting in birefringence.

According to some aspects of the present description, an optical lens assembly is provided in which at least one of the component lenses (i.e., that is two or more lenses which may be assembled to create an optical lens assembly) is allowed to have poor form accuracy because it does not have strong refractive power, and another of the component lenses is shaped to allow for easier injection molding and a significant reduction in form error. For example, the component lens disposed on the eye-side of the optical lens assembly (the eye-side lens, or simply, "eye-lens") may be configured with a nearly constant thickness across the lens. Configuring the eye-lens to have a substantially constant thickness allows it to be injection molded with very little resulting form error.

According to some aspects of the present description, an optical lens assembly for displaying an image emitted by a display to a viewer includes a middle-lens disposed between, and bonded to, an eye-lens (i.e., the lens that is closest to the eye of a viewer) and a display-lens (i.e., the lens closest to the display, or picture generating unit, generating the image to be displayed to the viewer). Each of the lenses (component lenses) has an active lens region defined as a maximum lens region configured to transmit an image emitted by the display therethrough.

In some embodiments, the following may be true across the corresponding active lens regions:

the eye-lens may include opposing curved first and second major surfaces, a maximum thickness tmax1, and a minimum thickness tmin1 less than tmax1 by less than a factor of about 2, or a factor of about 1.9, or a factor of about 1.7, or a factor of about 1.5, or a factor of about 1.3, or a factor of about 1.1;

the middle-lens may include a curved first major surface, an opposing second major surface, and a maximum thickness tmax2 greater than tmax1 by at least a factor of 1.5, or at least a factor of 2.0, or at least a factor of 2.5, or at least a factor of 3.0, or at least a factor of 4.0, or at least a factor of 5.0; and the display-lens may include a first major surface and an opposing curved second major surface.

In some embodiments, the eye-lens may have a substantially constant thickness. In some embodiments, the curved first major surface of the middle-lens may be curved in two mutually orthogonal directions. In some embodiments, the second major surface of the middle-lens may be substantially planar. In some embodiments, the second major surface of the middle-lens may be curved in at least one direction. In some embodiments, the second major surface of the middle-lens may be substantially cylindrical. In some embodiments, at least one of the curved first and second major surfaces of the eye-lens may be curved in two mutually orthogonal directions.

In some embodiments, a first at least partially light transmitting film is disposed proximate on, and substantially conforms to, the curved first major surface of the eye-lens. In some embodiments, the first at least partially light transmitting film may be disposed on, and may be substantially conforming to, the first major surface of the eye-lens. In some embodiments, the first at least partially light transmitting film may be bonded to the curved first major surface of the eye-lens by a bonding layer (e.g., an optical adhesive layer). In some embodiments, the first at least partially light transmitting film may be an absorbing polarizer. In some embodiments, the first at least partially light transmitting film may be an optically clear layer.

In some embodiments, a second at least partially light transmitting film (e.g., a reflective polarizer) is disposed between, and substantially conforms to each of, the curved second major surface of the eye-lens and the curved first major surface of the middle-lens. A first retarder layer (e.g., a quarter wave plate) is disposed between, and substantially conforms to each of, the second major surface of the middle-lens and the first major surface of the display-lens.

In some embodiments, a third at least partially light transmitting film (e.g., a 50:50 beamsplitter film) is disposed on, and substantially conforms to, the curved second major surface of display-lens. In some embodiments, the third at least partially light transmitting film may be disposed on the curved second major surface of the display-lens by one or more of lamination, electroplating, electroless plating, vacuum vapor deposition, plasma enhanced chemical vapor deposition, and printing.

For the purposes of this description, the term "film" may mean a coating, a thin film, a thick film, a single-layer film, a multi-layer film, a polymeric film (e.g., polyethylene terephthalate, or PET), or any other appropriate layer which may be differentiated from the lens or component to which the layer is adjacent and/or bonded to.

In some embodiments, for a substantially normally incident light and at least one wavelength in a visible wavelength range (i.e., human-visible) extending from about 450 nm to about 650 nm, each of the first through third at least partially light transmitting layers may transmit at least 30%, or at least 40%, or at least 50%, of the normally incident light having a first polarization state (e.g., light polarized to a reference x-axis of the layers), and each of the second and third at least partially light transmitting layers rejects at least 30%, or at least 40%, or at least 50%, of the normally incident light having an orthogonal, second polarization state (e.g., light polarized to a reference y-axis of the film, orthogonal to the x-axis). In some embodiments, for the substantially normally incident light and the at least one wavelength in the visible wavelength range, the first partially light transmitting layer (e.g., an optically clear layer) may transmit at least 80% of the normally incident light for each of the first and second polarization states. In some embodiments, for the substantially normally incident light and the at least one wavelength in the visible wavelength range, the first at least partially light transmitting layer (e.g., an absorbing polarizer) may transmit at least 50% of the normally incident light having the first polarization state and may absorb at least 30% of the normally incident light having the second polarization state.

According to some aspects of the present description, an optical lens assembly for displaying an image emitted by a display to a viewer includes a middle-lens disposed between, and bonded to, an eye-lens and a display-lens, each of the lenses having an active lens region defined as a maximum lens region configured to transmit an image emitted by the display therethrough.

In some embodiments, the following may be true across the corresponding active lens regions:

the eye-lens (i.e., the lens component nearest the eye of a viewer in operation) may include opposing curved first and second major surfaces, each of the major surfaces of the eye-lens having an actual surface profile that deviates by a first maximum peak-to-valley from a prescribed surface profile, the first maximum peak-to-valley deviation being less than about 10 microns, and the eye-lens having a maximum thickness tmax1 and a minimum thickness tmin1 less than tmax1 by less than about 30%;

the middle-lens (i.e., the lens component disposed between the eye-lens and the display-lens) may include a curved first major surface bonded to the second major surface of the eye-lens and an opposing second major surface, at least one of the first and second major surfaces of the middle-lens having an actual surface profile that deviates by a second maximum peak-to-valley from a prescribed surface profile, the second maximum peak-to-valley deviation being greater than about 15 microns, the middle-lens having a maximum thickness tmax2 greater than tmax1 by at least a factor of about 2; and the display-lens (i.e., the lens component nearest the display, furthest from the viewer) may include a first major surface bonded to the second major surface of the middle-lens and an opposing curved second major surface.

In some embodiments, a reflective polarizer may be disposed between, and substantially conforming to each of, the curved second major surface of the eye-lens and the curved first major surface of the middle-lens. In some embodiments, for a substantially normally incident light and at least one wavelength in a visible wavelength range extending from about 450 nm to about 650 nm, the reflective polarizer may transmit at least 50%, or at least 55%, or at least 60%, or at least 70%, of the normally incident light having a first polarization state (e.g., x-axis) and may reflect at least 50%, or at least 55%, or at least 60%, or at least 70%, of the normally incident light having an orthogonal second polarization state (e.g., y-axis).

According to some aspects of the present description, an optical lens assembly for displaying an image emitted by a display to a viewer includes a middle-lens disposed between, and bonded to, an eye-lens and a display-lens, each of the lenses having an active lens region defined as a maximum lens region configured to transmit an image emitted by the display therethrough.

In some embodiments, the following may be true across the corresponding active lens regions:

the eye-lens may include opposing curved first and second major surfaces, a maximum thickness tmax1 at a first location of the eye-lens, and a minimum thickness tmin1 at a second location of the eye-lens spaced apart from the first location by a distance d1, such that tmin1 is less than tmax1 by less than about 30%, and (tmax1−tmin1)/d1 is less than about 0.1;

the middle-lens may include a curved first major surface bonded to the second major surface of the eye-lens, an opposing second major surface, a maximum thickness tmax2, and a minimum thickness tmin2 less than tmax2 by greater than about 30%, such that tmax2 is greater than tmax1 by at least 30%, and the middle-lens may have a maximum birefringence of less than about 15 nm for at least one wavelength in a visible wavelength range extending from about 450 nm to about 650 nm; and the display-lens may include a first major surface bonded to the second major surface of the middle-lens and an opposing curved second major surface.

In some embodiments, a reflective polarizer may be disposed between, and substantially conforming to each of, the curved second major surface of the eye-lens and the curved first major surface of the middle-lens. In some embodiments, for substantially normally incident light and the at least one wavelength in the visible wavelength range, the reflective polarizer may transmit at least 50%, or at least 55%, or at least 60%, or at least 70%, of the normally incident light having a first polarization state and reflects at least 50%, or at least 55%, or at least 60%, or at least 70%, of the normally incident light having an orthogonal second polarization state.

According to some aspects of the present description, an optical lens assembly for displaying an image emitted by a display to a viewer along an optical axis includes a middle-lens disposed between, and bonded to, an eye-lens and a display-lens. Each of the lenses has an active lens region defined as a maximum lens region configured to transmit an image emitted by the display therethrough along the optical axis.

In some embodiments, the following may be true across the corresponding active lens regions:

the eye-lens may include opposing curved first and second major surfaces, a maximum thickness tmax1 and a minimum thickness tmin1, tmin1 less than tmax1 by less than about 30%;

the middle-lens may include a curved first major surface bonded to the second major surface of the eye-lens, an opposing second major surface, a maximum thickness tmax2, and a minimum thickness tmin2 less than tmax2 by greater than about 30%, such that tmax2 is greater than tmax1 by at least 30%; and the display-lens may include a first major surface facing the second major surface of the middle-lens and an opposing curved second major surface.

In some embodiments, the active lens regions of the middle-lens and the display-lens may define a space between the second major surface of the middle-lens and the first major surface of the display-lens. In some embodiments, one or more optical elements may fill the space and bond the middle-lens and the display lens to each other. In some embodiments, the one or more optical elements filling the space may include one or more adhesive layers. In some embodiments, the one or more optical elements filling the space may include a retarder layer (e.g., a quarter-wave plate). In some embodiments, a gap in the space between the second major surface of middle-lens and the first major surface of the display-lens varies irregularly across the space. That is, the space defined between the second major surface of the middle-lens and the first major surface of the display-lens, when not filled with one or more optical elements (i.e., the optical elements are omitted) may vary along one or more directions of the space.

In some embodiments, a minimum gap defined within the space between the second major surface of the middle-lens and the first major surface of the display-lens is Gmin, and a maximum gap between the second major surface of middle-lens and the first major surface of the display-lens is Gmax, such that Gmax−Gmin is greater than or equal to about 20 microns, or about 25 microns, or about 30 microns.

According to some aspects of the present description, an optical lens assembly for displaying an image emitted by a display to a viewer along an optical axis includes a middle-lens disposed between, and bonded to, an eye-lens and a display-lens. Each of the lenses has an active lens region defined as a maximum lens region configured to transmit an image emitted by the display therethrough along the optical axis.

In some embodiments, the following may be true across the corresponding active lens regions:

the eye-lens may include opposing curved first and second major surfaces, a maximum thickness tmax1 and a minimum thickness tmin1, tmin1 less than tmax1 by less than about 30%;

the middle-lens may include a curved first major surface bonded to the second major surface of the eye-lens, an opposing second major surface, a maximum thickness tmax2, and a minimum thickness tmin2 less than tmax2 by greater than about 30%, such that tmax2 is greater than tmax1 by at least 30%; and the display-lens may include a first major surface facing the second major surface of the middle-lens and an opposing curved second major surface.

In some embodiments, the active lens regions of the middle-lens and the eye-lens may define a space between the first major surface of the middle-lens and the second major surface of the eye-lens. In some embodiments, one or more optical elements may fill the space and bond the middle-lens and the eye-lens to each other. In some embodiments, the one or more optical elements filling the space may include one or more adhesive layers. In some embodiments, the one or more optical elements filling the space may include a reflective polarizer. In some embodiments, a gap in the space between the first major surface of middle-lens and the second major surface of the eye-lens may vary irregularly across the space. That is, the space defined between the first major surface of the middle-lens and the second major surface of the eye-lens, when not filled with one or more optical elements (i.e., the optical elements are omitted) may vary along one or more directions of the space.

In some embodiments, a minimum gap defined within the space between the first major surface of the middle-lens and the second major surface of the eye-lens is Hmin, and a maximum gap between the first major surface of middle-lens and the second major surface of the eye-lens is Hmax, such that Hmax–Hmin is greater than or equal to about 20 microns, or about 25 microns, or about 30 microns.

According to some aspects of the present description, an optical lens assembly may include a middle-lens disposed adjacent, and bonded to, a display-lens, the middle-lens having a curved first major surface and an opposing second major surface, a maximum thickness tmax, and a minimum thickness tmin less than tmax by greater than about 30%, and the display-lens having a first major surface facing the second major surface of the middle-lens and an opposing curved second major surface; and an optical film disposed between, and bonded to at least one of, the second major surface of the middle-lens and the first major surface of the display-lens. In some embodiments, the optical film may be insert-molded with, and embedded in, one of the second major surface of the middle-lens and the first major surface of the display-lens (i.e., the optical film may be integral to either the middle-lens or the display-lens and disposed such that it is embedded between the middle-lens and the display-lens). In some embodiments, the optical film may be a retarder, a reflective polarizer, an absorbing polarizer, or a polymeric film (e.g., a polyethylene terephthalate (PET) film).

In some embodiments, the second major surface of the middle-lens and the first major surface of the display-lens may define a space therebetween, wherein, in the space, a minimum gap between the second major surface of the middle-lens and the first major surface of the display-lens is Gmin, and a maximum gap between the second major surface of the middle-lens and the first major surface of the display-lens is Gmax, Gmax–Gmin is greater than or equal to about 20 microns, or about 25 microns, or about 30 microns.

Turning now to the drawings, FIG. 1 is a side, cutaway view of a two-lens optical lens assembly typical of the prior art. Prior art lens 150 in a two-component (or "two-lens") optical lens assembly featuring a display-side lens, or display-lens, 50 disposed on, and bonded to, a viewer-side lens, or viewer-lens, 15. The display-lens 50 is disposed adjacent to a display 10 (a "picture generating unit, or PGU), which generates an image 11 to be transmitted through lens assembly 150 to be viewed by the eye of a viewer 20 as perceived image 12. The viewer-lens 15 has a curved first major surface 14 and a substantially planar second major surface 16. In this cutaway, side profile view, the first major surface 14 and second major surface 16 define a cross-section which has a varying thickness across viewer-lens 15. First major surface 14 of viewer-lens 15, closest to the viewer 20, typically has a reflective polarizer disposed upon it (not shown). Because of the significant change in thickness across the viewer-lens 15, the lens is expected to have high molded-in stresses resulting which will likely result in high birefringence. The viewer-lens 15 will also exhibit high form error due to differences in thermal shrinkage across the part.

Additionally, if the viewer-lens 15 is fabricated through an insert-molding or "in-mold decoration" process (i.e., the reflective polarizer is placed on first major surface 14 during the insert molding process, while the lens is cooling), the lens may have a high form error due to highly anisotropic thermo-mechanical properties, such as modulus of elasticity and coefficient of thermal expansion (CTE).

Figure 2:
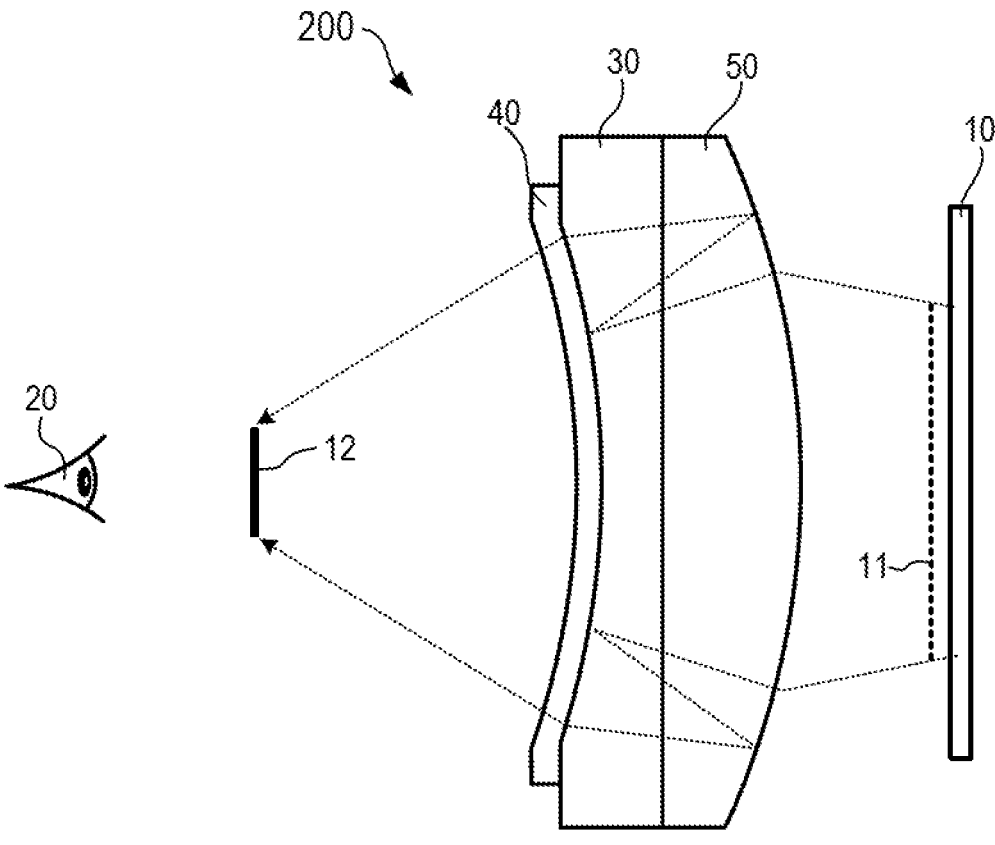
FIG. 2 is a side, cutaway view of an optical lens assembly, in accordance with an embodiment of the present description.
Figure 3A:
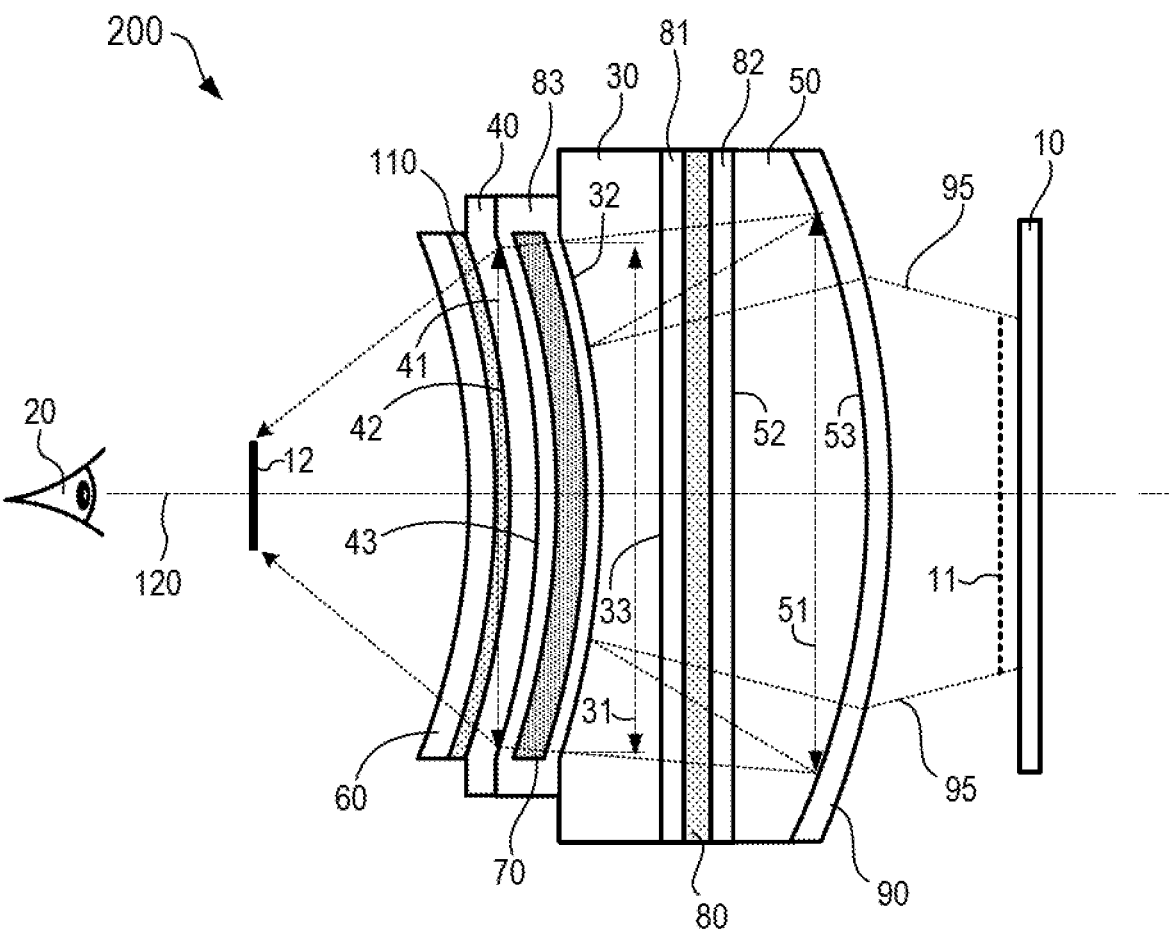
FIGS. 3A and 3B provide profile views of the optical lens assembly of FIG. 2, showing additional detail, in accordance with an embodiment of the present description.
Figure 3B:
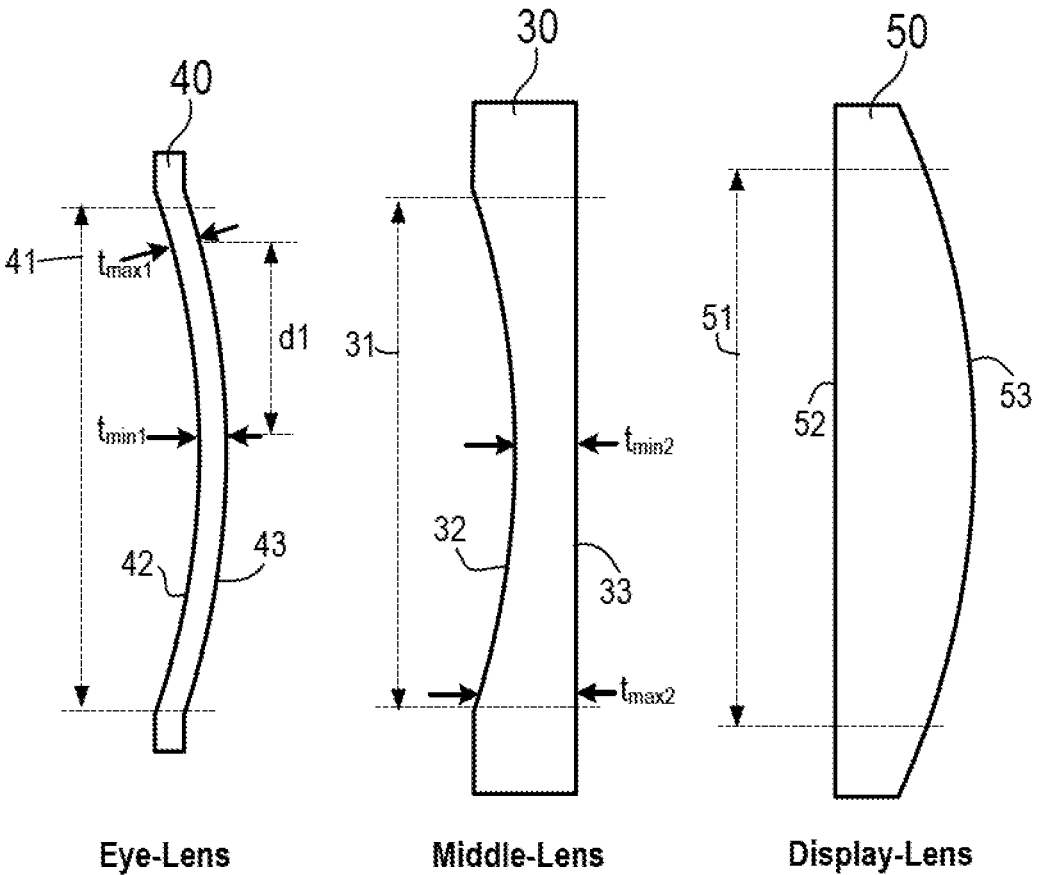

FIG. 2 is a side, cutaway view of an embodiment of an optical lens assembly according to the present description, and FIGS. 3A and 3B provide profile views of the optical lens assembly of FIG. 2, showing additional detail and layers. Looking first at FIG. 2, which shows the optical lens assembly at a high level, optical lens assembly 200 includes a middle-lens 30 disposed between, and bonded to, a display-lens 50 and an eye-side lens, or eye-lens 40. That is, what was implemented as a single-component viewer-lens 15 in FIG. 1 is divided into two lens components in the embodiment of FIG. 2, a middle-lens 30 and an eye-lens 40. By implementing the lens assembly as three lens components, it is possible to configure the eye-lens 40 as a thin lens with substantially constant thickness, significantly reducing the form error over the single-piece, varying thickness viewer-lens 15 seen in the prior art embodiment of FIG. 1. Compared to prior art lens components such as viewer-lens 15 of FIG. 1, the eye-lens 40 may exhibit lower birefringence, decreased warp, decreased form error, decreased astigmatism, and increased reliability. For example, eye-lens 40 may exhibit an improved ability to withstand extreme temperature ranges and humidity excursions without a significant change in shape or form. Additionally, the middle-lens 30 is easier to mold, as it is not required to have tight form tolerances and it can be optimized for low birefringence without undue effort to maintain tight form tolerances. In some embodiments, the mating surfaces of middle-lens 30 (i.e., the surface bonded to eye-lens 40 and display-lens 50) are neither strongly refractive nor reflective surfaces, and can be bonded to the eye-lens 40 and display-lens 50 using an optically-transparent adhesive, such as optical cement, for example, with a similar index of refraction to the lens components it is bonding.

FIGS. 3A and 3B provide additional details on the optical lens assembly 200 of FIG. 2, and the figures should be viewed together for the following discussion. Optical lens assembly 200 includes a middle-lens 30 disposed between, and bonded to, an eye-lens 40 and a display-lens 50. In some embodiments, middle-lens 30 includes a curved first major surface 32 and an opposing second major surface 33. In some embodiments, display-lens 50 includes a first major surface 52 and an opposing curved second major surface 53. In some embodiments, eye-lens 40 includes opposing curved first major surface 42 and curved second major surface 43.

In some embodiments, each of the major surfaces 42, 43 of the eye-lens may have an actual surface profile that deviates by a first maximum peak-to-valley value from a prescribed surface profile, the first maximum peak-to-valley deviation being less than about 10 microns. In some embodiments, at least one of the first major surface 32 and the second major surface 33 of the middle-lens 30 may have an actual surface profile that deviates by a second maximum peak-to-valley value from a prescribed surface profile, the second maximum peak-to-valley deviation being greater than about 15 microns, or greater than about 20 microns, or greater than about 25 microns.

Looking at FIG. 3B, in some embodiments, the eye-lens may have a maximum thickness, tmax,1 and a minimum thickness, tmin1, less than tmax1 by less than about 30%, or less than about 25%, or less than about 20%, or less than about 15%. In some embodiments, tmax1 is located at a first location of eye-lens 40, and tmin1 is located at a second location of eye-lens 40, where the second location is at a distance d1 from the first location. In some embodiments, the value of (tmax1−tmin1)/d1 may be less than about 0.1. In some embodiments, the middle-lens 30 may have a minimum thickness, tmin2, and a maximum thickness, tmax2, where tmax2 is greater than tmax1 by at least a factor of 2, or at least a factor of 3, or at least a factor of 4.

In some embodiments, a first at least partially light transmitting film 60 is disposed on, and substantially conforms to, the curved first major surface 42 of the eye-lens 40. In some embodiments, this first at least partially light transmitting film 60 may be an absorbing polarizer. In some embodiments, this first at least partially light transmitting film 60 may be an optically clear film. In some embodiments, the first at least partially light transmitting film 60 may be bonded to the curved first major surface 42 of the eye-lens 40 by a bonding layer 110.

In some embodiments, a second at least partially light transmitting film 70 is disposed between, and substantially conforms to, each of the curved second major surface 43 of the eye-lens 40 and the curved first major surface 32 of the middle-lens 30. In some embodiments, the second at least partially light transmitting film 70 may be a reflective polarizer. In some embodiments, the second at least partially light transmitting film 70 may be bonded to the curved second major surface 43 of the eye-lens 40 and the curved first major surface 32 of the middle-lens 30 by one or more adhesive layers 83.

In some embodiments, the eye-lens 40 may have a substantially constant thickness. In some embodiments, the eye-lens 40 may be created using an injection molding or insert molding process. In some embodiments, the eye-lens 40 may be molded with the first at least partially light transmitting film 60 and the second at least partially light transmitting film 70 on opposite faces of the eye-lens 40. This creates a "sandwich" structure with an inner core and outer "skins" disposed on the opposing curved first major surface 42 and curved second major surface 43.

In some embodiments, a first retarder layer 80 may be disposed between, and substantially conforming to, each of the second major surface 33 of the middle-lens 30 and the first major surface 52 of the display-lens 50. In some embodiments, the first retarder layer 80 may be bonded to the second major surface 33 of the middle-lens 30 and the first major surface 52 of the display-lens 50 by one or more adhesive layers 81, 83. In some embodiments, the first retarder layer 80 may be insert-molded with (i.e., integral to) either the middle-lens 30 or display-lens 50. In such embodiments, the first retarder layer 80 may be embedded between the middle-lens 30 and display-lens 50. In some embodiments, first retarder layer 80 may be a quarter wave plate.

In some embodiments, a third at least partially light transmitting film 90 may be disposed on, and substantially conforming to, the curved second major surface 53 of display-lens 50. In some embodiments, third at least partially light transmitting film 90 may be a 50:50 beamsplitter film.

Each of these lens components (i.e., middle-lens 30, eye-lens 40, and display-lens 50) include an active lens region, which is defined as a maximum lens region configured to transmit an image 11 emitted by the display 10 through optical lens assembly 200 to be viewed as a perceived image 12 by the eye of a viewer 20. These active lens regions include active lens region 51 of the display-lens 50, active lens region 41 of the eye-lens 40, and active lens region 31 of the middle-lens 30.

In one example embodiment, image 11 is transmitted by display 10 as image rays 95. Image rays 95 are transmitted from display 10 toward optical lens assembly 200, first incident on 50:50 beamsplitter film 90 and transmitted through display-lens 50. Image rays 95 may then pass through quarter-wave plate 80, be reflected by reflective polarizer 70, passed back through quarter-wave plate 80, reflected by beamsplitter film 90, passed a final time back through quarter-wave plate 80, through reflective polarizer 70 (now in the proper polarization state to pass), and out through eye-lens 40, creating perceived image 12 for the eye of the viewer 20 along optical axis 120. The path of the image rays 95 through the various lens components defines each of the active lens regions 51, 31, and 41. It should be noted that only the outermost image rays 95 are shown in FIG. 3A as examples, to better illustrate the boundaries of active lens regions 51, 31, and 41.

In some embodiments, for a substantially normally incident light 101 (see incident light 101, FIG. 6B) and the at least one wavelength in a visible wavelength range (e.g., human-visible light in a range extending from about 450 nm to about 650 nm), the reflective polarizer may transmit at least 50%, or at least 55%, or at least 60%, or at least 65%, of the normally incident light having a first polarization state (e.g., aligned to the film's x-axis) and reflects at least 50%, or at least 55%, or at least 60%, or at least 65%, of the normally incident light having an orthogonal second polarization state (e.g., aligned to the film's y-axis).

Figure 6A:
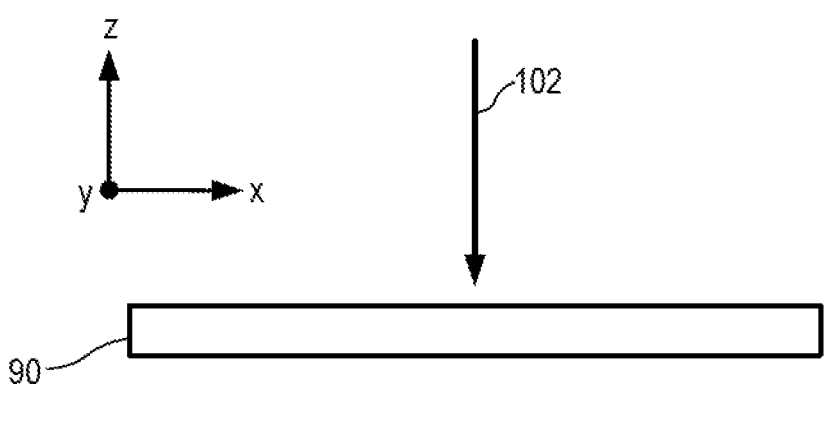
FIGS. 6A-6C define normally incident light with regard to various layers of an optical lens assembly, in accordance with an embodiment of the present description.
Figure 6B:
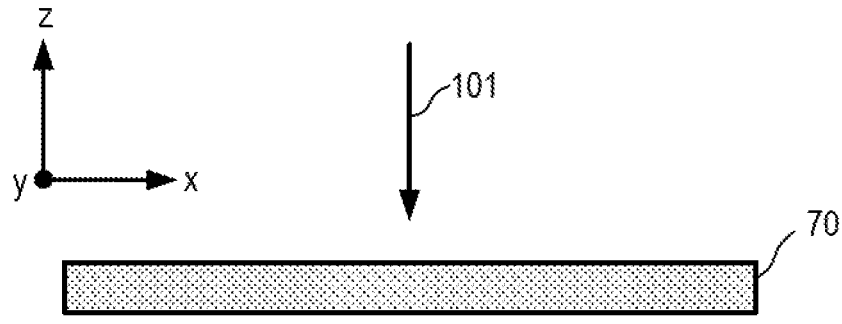
Figure 6C:
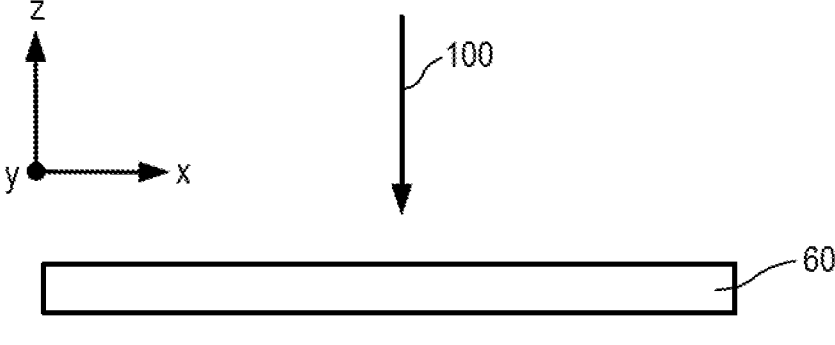

In some embodiments, for substantially normally incident light and at least one wavelength in a visible wavelength range extending from about 450 nm to about 650 nm, each of the first through third at least partially light transmitting layers, transmits at least 30%, or at least 35%, or at least 40%, or at least 45%, of the normally incident light having a first polarization state (x-axis), and each of the second and third at least partially light transmitting layers rejects at least 30%, or at least 35%, or at least 40%, or at least 45%, of the normally incident light having an orthogonal second polarization state (y-axis). Refer to FIG. 6A for a definition of normally incident light 102 on the third at least partially light transmitting film 90. Refer to FIG. 6B for a definition of normally incident light 101 on the second at least partially light transmitting film 70. Refer to FIG. 6C for a definition of normally incident light 100 on the first at least partially light transmitting film 60.

Figure 4:
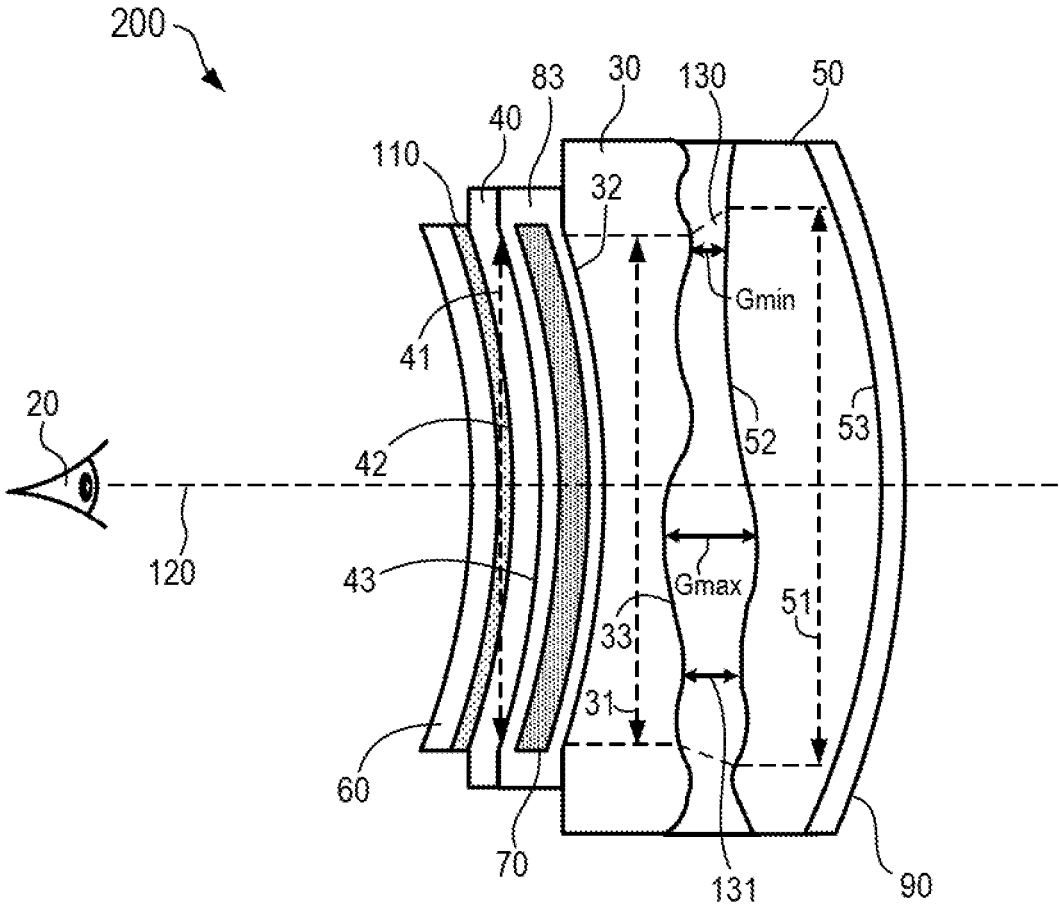
FIG. 4 shows lens interface details of an optical lens assembly, in accordance with an embodiment of the present description.
Figure 5:
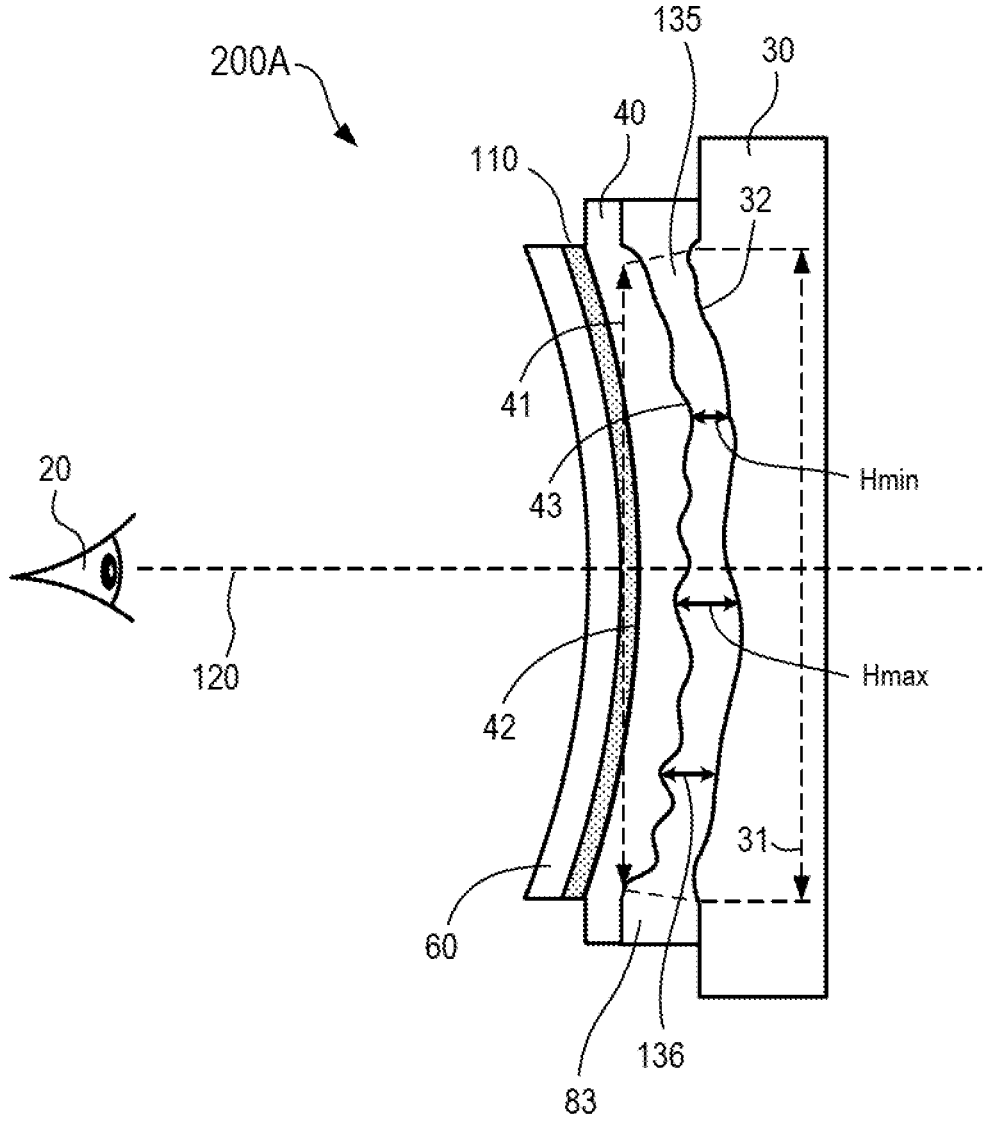
FIG. 5 shows lens interface details of a portion of an optical lens assembly, in accordance with an embodiment of the present description.

FIG. 4 shows an alternate view of optical lens assembly 200 showing additional detail on the interface between the display-lens 50 and middle-lens 30, and FIG. 5 illustrates additional detail on the interface between the eye-lens 40 and middle-lens 30. Many of the components in FIGS. 4 and 5 are repeated from FIG. 3, and like-numbered components are assumed to have a similar function to those already discussed elsewhere herein, unless explicitly stated otherwise.

Looking first at FIG. 4, an optical lens assembly 200 includes a middle-lens 30 disposed between, and bonded to, an eye-lens 40 and a display-lens 50. The interface between the display-lens 50 and middle-lens 30 is shown in exaggerated detail, showing that surface 52 (of display-lens 50) and surface 33 (of middle-lens 30) may exhibit significant surface profile errors. That is, the middle-lens 30 and display-lens 50 are allowed to have poor form accuracy as they do not have strong refractive power, and a space 130 is defined between these lens components by the active lens regions 51 and 31 of the display-lens 50 and middle-lens 30, respectively, which may be filled by one or more optical elements (e.g., adhesive fillers and/or a retarder layer). In this space 130, a minimum gap between the second major surface 33 of middle-lens 30 and the first major surface 52 of the display-lens 50 is Gmin, and a maximum gap between the second major surface 33 of middle-lens 30 and the first major surface 52 of the display-lens 50 is Gmax, such that the value of Gmax−Gmin is greater than or equal to about 20 microns, or about 25 microns, or about 30 microns. In some embodiments, a gap 131 between middle-lens 30 and display-lens 50 in space 130 may vary irregularly across space 130.

FIG. 5 shows similar details on the interface between the eye-lens 40 and middle-lens 30. It should be noted that, for clarity, only a portion of the optical lens assembly 200A is shown, focusing on the interface between eye-lens 40 and middle-lens 30. The interface between the eye-lens 40 and middle-lens 30 is shown in exaggerated detail, showing that surface 43 (of eye-lens 40) and surface 32 (of middle-lens 30) may exhibit significant surface profile errors. That is, the middle-lens 30 and at least surface 43 of eye-lens 40 may exhibit poor form accuracy. A space 135 is defined between these lens components by the active lens regions 41 and 31 of the eye-lens 40 and middle-lens 30, respectively, which may be filled by one or more optical elements (e.g., adhesive fillers and/or a reflective polarizer). In this space 135, a minimum gap between the first major surface 32 of middle-lens 30 and the second major surface 43 of the eye-lens 40 is Hmin, and a maximum gap between the first major surface 32 of middle-lens 30 and the second major surface 43 of the eye-lens 40 is Hmax, such that the value of Hmax−Hmin is greater than or equal to about 20 microns, or about 25 microns, or about 30 microns. In some embodiments, a gap 136 between middle-lens 30 and eye-lens 40 in space 135 may vary irregularly across space 135.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical lens assembly for displaying an image emitted by a display to a viewer, the optical lens assembly comprising:

a middle-lens disposed between, and bonded to, an eye-lens and a display-lens, each of the lenses comprising an active lens region defined as a maximum lens region configured to transmit the image emitted by the display therethrough, such that at least across the corresponding active lens regions:

the eye-lens comprises opposing curved first and second major surfaces, a maximum thickness tmax1, and a minimum thickness tmin1 less than tmax1 by less than a factor of 2;

the middle-lens comprises a curved first major surface, an opposing second major surface, and a maximum thickness tmax2 greater than tmax1 by at least a factor of 1.5; and the display-lens comprises a first major surface and an opposing curved second major surface;

a first at least partially light transmitting film is disposed proximate on, and substantially conforms to, the curved first major surface of the eye-lens;

a second at least partially light transmitting film is disposed between, and substantially conforms to each of, the curved second major surface of the eye-lens and the curved first major surface of the middle-lens;

a first retarder layer is disposed between, and substantially conforms to each of, the second major surface of the middle-lens and the first major surface of the display-lens; and a third at least partially light transmitting film is disposed on, and substantially conforms to, the curved second major surface of the display-lens;

wherein for a substantially normally incident light and at least one wavelength in a visible wavelength range extending from about 450 nm to about 650 nm, each of the first through third at least partially light transmitting layers, transmits at least 30% of the substantially normally incident light having a first polarization state, and each of the second and third at least partially light transmitting layers rejects at least 30% of the substantially normally incident light having an orthogonal second polarization state.

2. The optical lens assembly of claim 1, wherein the third at least partially light transmitting film is disposed on the curved second major surface of the display-lens by at least one of lamination, electroplating, electroless plating, vacuum vapor deposition, physical vapor deposition, plasma enhanced chemical vapor deposition, and printing.

3. The optical lens assembly of claim 2, wherein for the substantially normally incident light and the at least one wavelength in the visible wavelength range, the first at least partially light transmitting film transmits at least 80% of the substantially normally incident light for each of the first and second polarization states.

4. The optical lens assembly of claim 1, wherein at least one of the curved first and second major surfaces of the eye-lens is curved in two mutually orthogonal directions.

5. The optical lens assembly of claim 1, wherein the curved first major surface of the middle-lens is curved in two mutually orthogonal directions.

6. The optical lens assembly of claim 1, wherein the second major surface of the middle-lens is substantially planar.

7. The optical lens assembly of claim 1, wherein the second major surface of the middle-lens is curved in at least one direction.

8. The optical lens assembly of claim 1, wherein the second major surface of the middle-lens is substantially cylindrical.

9. The optical lens assembly of claim 1, wherein the first at least partially light transmitting film is disposed on, and substantially conforms to, the first major surface of the eye-lens.

10. The optical lens assembly of claim 9, wherein the first at least partially light transmitting film is bonded to the curved first major surface of the eye-lens by a bonding layer.

11. The optical lens assembly of claim 1, wherein for the substantially normally incident light and the at least one wavelength in the visible wavelength range, the first at least partially light transmitting film transmits at least 50% of the substantially normally incident light having the first polarization state, and absorbs at least 30% of the substantially normally incident light having the second polarization state.

12. An optical lens assembly for displaying an image emitted by a display to a viewer along an optical axis, the optical lens assembly comprising:

a middle-lens disposed between, and bonded to, an eye-lens and a display-lens, each of the lenses comprising an active lens region defined as a maximum lens region configured to transmit the image emitted by the display therethrough along the optical axis, such that at least across the corresponding active lens regions:

the eye-lens comprises opposing curved first and second major surfaces, a maximum thickness tmax1 and a minimum thickness tmin1, tmin1 less than tmax1 by less than about 30%;

the middle-lens comprises a curved first major surface bonded to the second major surface of the eye-lens, an opposing second major surface, a maximum thickness tmax2, and a minimum thickness tmin2 less than tmax2 by greater than about 30%, tmax2 greater than tmax1 by at least 30%; and the display-lens comprises a first major surface facing the second major surface of the middle-lens and an opposing curved second major surface;

wherein the active lens regions of the middle-lens and the display-lens define a space between the second major surface of the middle-lens and the first major surface of the display-lens, one or more optical elements filling the space and bonding the middle-lens and the display-lens to each other, wherein in the space, a minimum gap between the second major surface of the middle-lens and the first major surface of the display-lens is Gmin, and a maximum gap between the second major surface of the middle-lens and the first major surface of the display-lens is Gmax, Gmax−Gmin≥20 microns.

13. The optical lens assembly of claim 12, wherein the one or more optical elements filling the space comprises one or more adhesive layers.

14. The optical lens assembly of claim 12, wherein the one or more optical elements filling the space comprises a retarder layer.

15. The optical lens assembly of claim 12, wherein a gap in the space between the second major surface of the middle-lens and the first major surface of the display-lens varies irregularly across the space.

16. An optical lens assembly for displaying an image emitted by a display to a viewer along an optical axis, the optical lens assembly comprising:

a middle-lens disposed between, and bonded to, an eye-lens and a display-lens, each of the lenses comprising an active lens region defined as a maximum lens region configured to transmit the image emitted by the display therethrough along the optical axis, such that at least across the corresponding active lens regions:

the eye-lens comprises opposing curved first and second major surfaces, a maximum thickness tmax1 and a minimum thickness tmin1, tmin1 less than tmax1 by less than about 30%;

the middle-lens comprises a curved first major surface bonded to the second major surface of the eye-lens, an opposing second major surface, a maximum thickness tmax2, and a minimum thickness tmin2 less than tmax2 by greater than about 30%, tmax2 greater than tmax1 by at least 30%; and the display-lens comprises a first major surface facing the second major surface of the middle-lens and an opposing curved second major surface;

wherein the active lens regions of the middle-lens and the eye-lens define a space between the first major surface of the middle-lens and the second major surface of the eye-lens, one or more optical elements filling the space and bonding the middle-lens and the eye-lens to each other, wherein in the space, a minimum gap between the first major surface of the middle-lens and the second major surface of the eye-lens is Hmin, and a maximum gap between the first major surface of the middle-lens and the second major surface of the eye-lens is Hmax, Hmax−Hmin≥20 microns.

17. The optical lens assembly of claim 16, wherein the one or more optical elements filling the space comprises one or more adhesive layers.

18. The optical lens assembly of claim 16, wherein the one or more optical elements filling the space comprises a reflective polarizer.

19. The optical lens assembly of claim 16, wherein a gap (136) in the space between the first major surface of the middle-lens and the second major surface of the eye-lens varies irregularly across the space.

* * * * *